Jan. 2, 1940.     J. H. SCHURCH     2,185,990
INDUCTION MOTOR
Filed Oct. 30, 1937     6 Sheets-Sheet 1
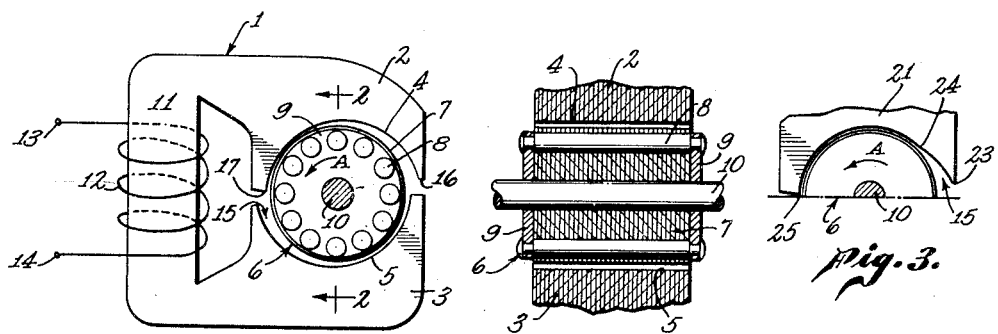
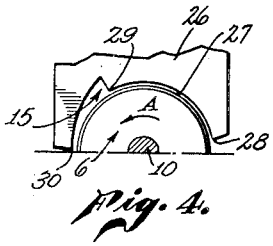
Fig. 1.
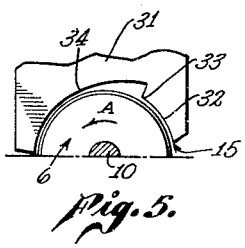
Fig. 2.
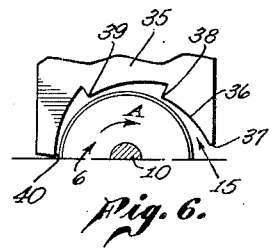
Fig. 3.
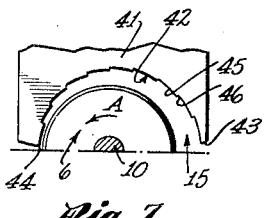
Fig. 4.
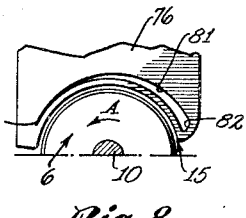
Fig. 5.
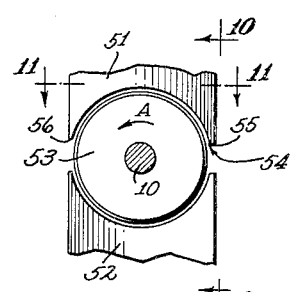
Fig. 6.
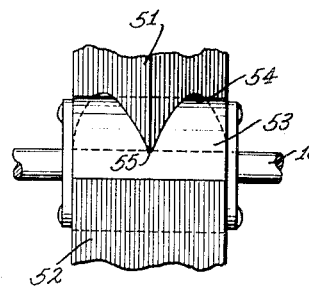
Fig. 7.
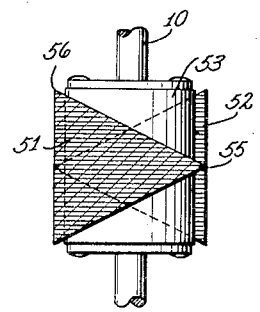
Fig. 8.
Fig. 9.
Fig. 10.
Fig. 11.
Inventor
Jacob H. Schurch
By Arthur P. Knight and
Alfred W. Knight
Attorneys Jan. 2, 1940.  J. H. SCHURCH  2,185,990
INDUCTION MOTOR
Filed Oct. 30, 1937    6 Sheets-Sheet 2
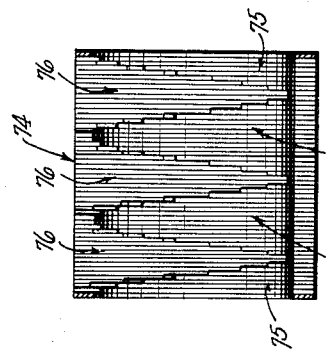
Fig. 17.
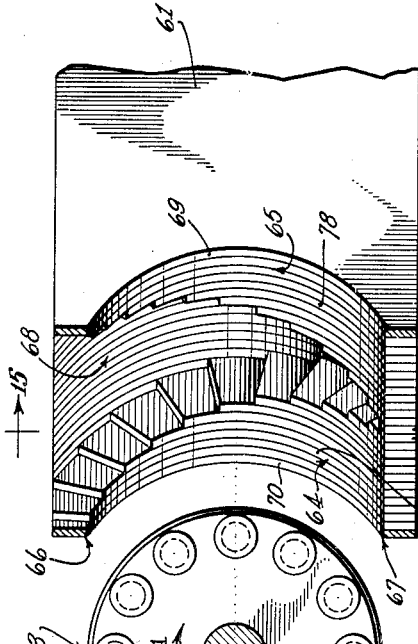
Fig. 12.
Fig. 14.
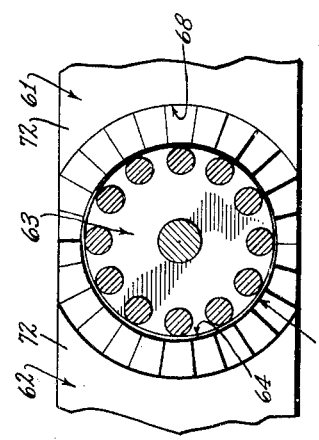
Fig. 16.
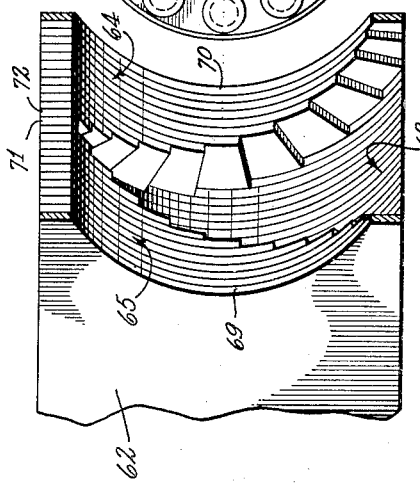
Fig. 13.
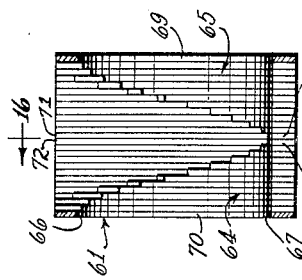
Fig. 15.
Inventor
Jacob H. Schurch
By Arthur P. Knight and
Alfred W. Knight
Attorneys Jan. 2, 1940.   J. H. SCHURCH   2,185,990
INDUCTION MOTOR
Filed Oct. 30, 1937   6 Sheets-Sheet 3

Inventor
Jacob H. Schurch
By Arthur P. Knight and
Alfred W. Knight
Attorneys

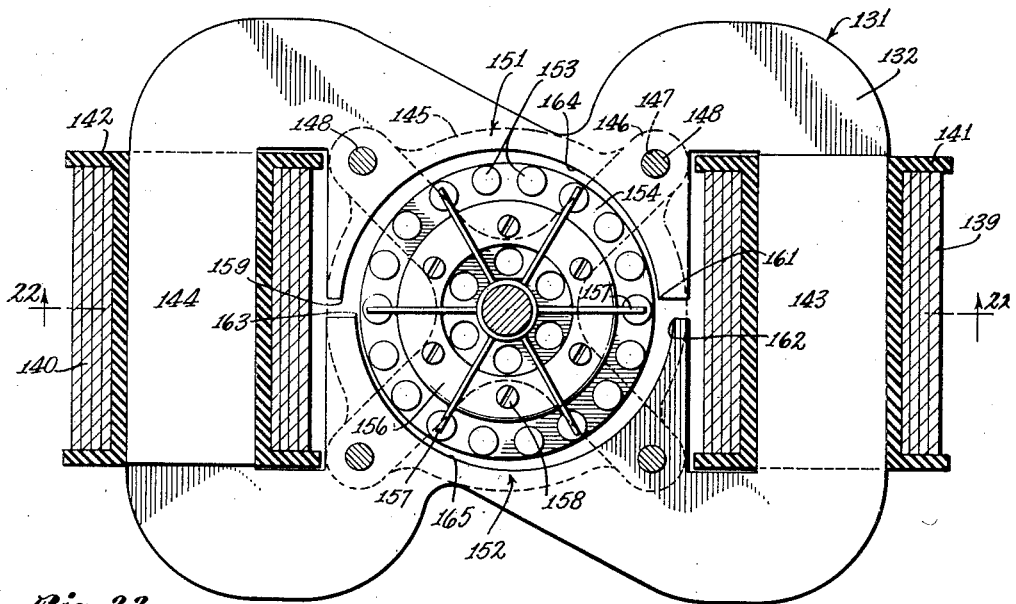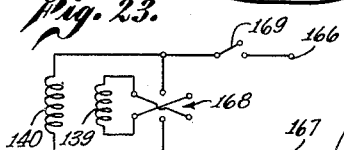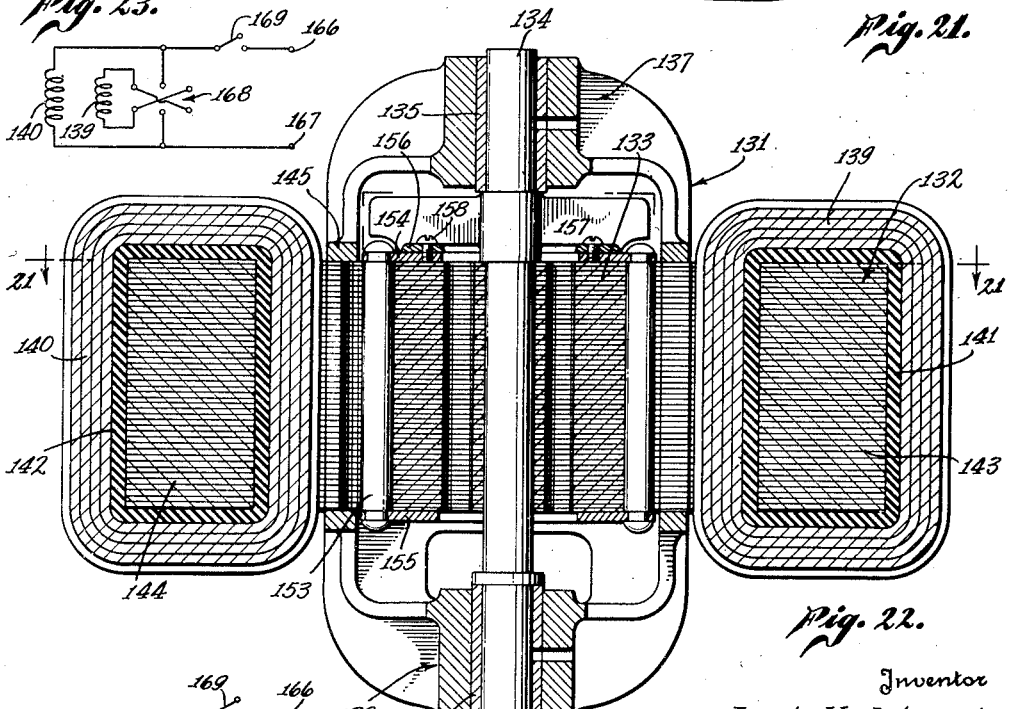

Jan. 2, 1940.   J. H. SCHURCH   2,186,010

INDUCTION MOTOR

Filed Oct. 30, 1937   6 Sheets-Sheet 5

Inventor
Jacob H. Schurch

By Arthur P. Knight and
Alfred W. Knight
Attorneys

Jan. 2, 1940.   J. H. SCHURCH   2,185,990
INDUCTION MOTOR
Filed Oct. 30, 1937   6 Sheets-Sheet 6

Inventor
Jacob H. Schurch

By Arthur P. Knight and
Alfred W. Knight
Attorneys

UNITED STATES PATENT OFFICE 2,185,990

INDUCTION MOTOR

Jacob H. Schurch, Los Angeles, Calif., assignor of one-half to William H. Heise, Los Angeles, Calif.

Application October 30, 1937, Serial No. 171,948

12 Claims. (Cl. 172—278)

This invention relates to electric motors and pertains particularly to a self-starting single-phase induction motor.

The principal object of the invention is to provide a single-phase induction motor which is self-starting and does not require the use of a commutator, short-circuited windings, auxiliary starting windings, or centrifugal starting switches.

Another object of the invention is to provide a single-phase induction motor which may be started directly from the line without the use of any auxiliary starting equipment.

Another object of the invention is to provide a motor of the class described having a high starting torque.

A further object of the invention is to provide a self-starting single-phase induction motor which has a high power factor, in even the smallest sizes, while running.

Another object of the invention is to provide a self-starting single-phase induction motor which has a high efficiency.

Another object of the invention is to provide a self-starting single-phase induction motor which may be simply and inexpensively constructed and which may be easily adapted to production methods.

Another object of the invention is to provide a self-starting single-phase induction motor which may be easily assembled and disassembled, thereby lessening the cost of construction and repair.

A further object of the invention is to provide a self-starting single-phase induction motor which exhibts good speed regulation under changing loads.

A further object of the invention, in one form thereof, is to provide a self-starting single-phase induction motor which provides an asymmetric flux distribution at one or more of the poles to exert a torque on the rotor, for starting, and which operates automatically to decrease the magnetic reluctance of the magnetic circuit, and consequently increase the magnetic flux, through such one or more poles during running. In this connection it is a further object to provide a motor in which the flux distribution along said one or more pole members, during running, is substantially sinusoidal.

Further objects and advantages of the invention will either be specifically brought out in the following description or will become apparent therefrom.

Numerous arrangements have been utilized to start single-phase induction motors, the most common of which are shading the poles with short circuiting rings in the smaller sizes of motors, the use of auxiliary windings which are not used during running of the motor, and the use of a commutator to provide repulsion starting. Both of the last-described arrangements require the use of auxiliary switching mechanisms to change the connection of the motor after it has started and such arrangements necessarily increase the initial cost and the cost of maintenance of such motors. The use of shaded poles generally increases the losses in the motors and such motors are generally inefficient.

The self-starting single-phase induction motor of this invention comprises, in general, a rotor and a stator whose core is provided with one or more pairs of pole members defining successive magnetic poles of opposite polarity and having faces extending peripherally and axially with respect to the rotor and spaced radially from the rotor. Preferably all, but at least one, of the pole members is so shaped and arranged that in at least a part of the peripheral extent of the face thereof, the magnetic flux passing through peripherally successive axially extending portions of said face progressively increases in a peripheral direction along said face so as to exert a starting torque on the rotor and cause rotation thereof in said direction.

It is preferable to provide this progressive increase in the total flux passing through the successive peripheral portions of the pole faces, along substantially the entire peripheral extent of each of said pole faces in order to obtain a maximum starting torque. Furthermore, it is advantageous to construct the pole faces so that the increase in total flux passing through said portions or areas progresses in a uniform and preferably straight-line manner.

This increase in total flux may be brought about by progressively decreasing the radial spacing of the pole faces from the rotor in a peripheral direction around the rotor, through all or part of the peripheral extent of the pole faces, by maintaining the pole faces at a constant radial spacing from the rotor and removing a portion of the pole above the faces, of progressively decreasing radial depth or of progressively decreasing axial length, or by a combination of any of the above arrangements, or by other means which will become apparent as the description proceeds.

All forms of the motor of this invention are started by virtue of the progressive increase in total flux passing through successive portions of a pole face in a peripheral direction around the rotor, and in one form of the invention a portion of one or more pole members is moved after the rotor has started, to reduce the magnetic reluctance of the air gap and preferably to provide a flux distribution at the pole faces which approaches sinusoidal in a peripheral direction over each pole face. This form of invention combines the high starting torque provided by the progressively increasing or inhomogeneous field with a somewhat higher running efficiency which may be obtained with a sinusoidal flux distribution.

While it is to be understood that I do not wish to restrict myself to any exact theory as constituting the fundamental basis of this invention, the following probable explanation may be given, which is based on known principles and which is apparently confirmed by actual operating tests.

Considering a two-pole motor as an example, the rotor may be considered as a two-pole magnet which has its poles located at points in the air gap between the two stator pole faces. In cases where the flux distribution produced by the pole faces in the air gap is symmetric with respect to an axially extending line, there will be no tendency for the magnetically polarized rotor to rotate. However, in cases in which the field is inhomogeneous, that is, in cases in which the flux distribution is asymmetric and there is a progressive increase in the total flux passing through peripherally successive elongated areas extending axially across each pole face there is a tendency for the magnetic poles of the rotor to move toward the region of high flux density. Thus the rotor may be considered to have a magnetic moment and the forces on the rotor will be equal to its magnetic moment multiplied by the change in flux density per unit peripheral length of the pole face. This force is present not only during starting of the motor but is also present during running, and under certain conditions the motor will run at a speed which is higher than the calculated synchronous speed. Extensive tests have shown that motors constructed to start and run with an inhomogeneous or asymmetric field follow closely the results as calculated on the basis of the above principles. Thus the motor of this invention starts and runs with a field flux which is substantially in phase at all portions of a pole face and does not require the use of any means for obtaining a polyphase flux in the pole faces.

The accompanying drawings are illustrative of certain forms of construction which may be utilized for producing self-starting single-phase induction motors according to my invention, and referring thereto:

Fig. 1 is a partly diagrammatic side elevation of a motor according to my invention;

Fig. 2 is a partial section thereof taken on line 2—2 in Fig. 1;

Figs. 3 through 8 show modified forms of poles which may be substituted for the poles of the motor shown in Fig. 1;

Fig. 9 is an elevational view corresponding to Fig. 1, showing a further modified form of the motor;

Fig. 10 is a front elevation thereof taken on line 10—10 in Fig. 9;

Fig. 11 is a sectional view thereof taken on line 11—11 in Fig. 9;

Figs. 12 through 14 illustrate another modified form of the motor in which Fig. 12 is a view of the rotor thereof in end elevation, and Figs. 13 and 14 are views of the respective poles thereof in perspective;

Fig. 15 is a sectional view taken on line 15—15 in Fig. 14, showing the face of a pole member;

Fig. 16 is a sectional view of this form of motor, taken on line 16—16 in Fig. 15;

Fig. 17 is a view corresponding in general to Fig. 15, illustrating a modification of the pole face shown in Fig. 15;

Fig. 21 is a transverse section of a two-speed motor utilizing the principles of my invention, taken on line 21—21 in Fig. 22;

Fig. 22 is a longitudinal section thereof taken on line 22—22 in Fig. 21;

Figs. 23 and 24 are wiring diagrams showing, by way of examples, two different switching arrangements which may be employed for changing the speed of this form of motor;

Figure 18:
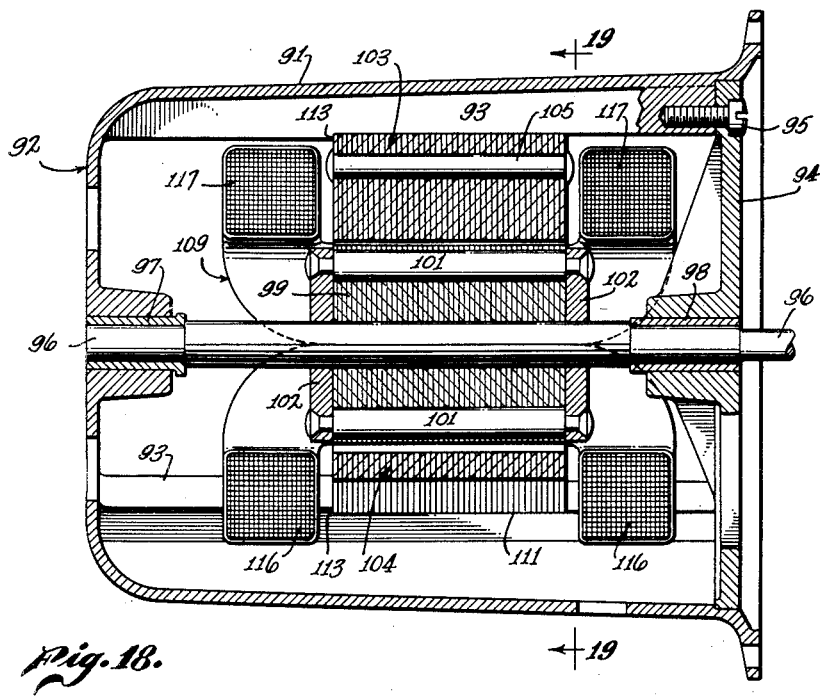
Fig. 18 is a longitudinal cross-section of a form of motor according to my invention which corresponds in general to Fig. 1, taken on line 18—18 in Fig. 19.

Referring to Figs. 1 and 2, a single-phase induction motor is indicated generally at 1 and is shown as comprising suitably laminated pole members 2 and 3 which are provided with pole faces 4 and 5, respectively. A squirrel-cage rotor is indicated at 6 and may comprise a laminated core 7 provided with the usual conductor bars 8 connected together by end rings 9. A rotor shaft is indicated at 10 and the bearings and supports therefor are omitted for the purpose of clarity. The poles 2 and 3 are connected together by a magnetic yoke 11 about which is wound a suitable stator coil 12 provided with terminals 13 and 14 which may be connected to a source of alternating current. The stator core comprises yoke 11 and pole members 2 and 3. Thus energization of the coil 12 produces a magnetic flux which traverses the magnetic circuit comprising the yoke, the poles, the rotor, and the air gaps between the pole faces and the rotor 6. The pole members 2 and 3 define two magnetic poles of opposite polarity.

The pole faces 4 and 5 may be considered to have the same axial extent for all peripheral portions thereof and are spaced radially from the rotor to provide an air gap indicated at 15. The direction of rotation of the rotor is indicated by the arrow A and it may be seen by inspection of Fig. 1 that the radial dimension of the air gap decreases for each successive peripheral portion of a pole face in the direction of rotation of the rotor. Thus the magnetic flux through peripherally successive axially extending portions of each pole face progressively increases in one direction around the periphery of the pole face. In this particular case the increase is substantially uniform from one end 16 (the leading edge) to the other end 17 (the trailing edge) of the pole face. This increase arises from the fact and the periphery of the rotor 6 decreases in a progressive manner in a peripheral direction around the rotor (and also along the pole face) from the leading edge 16 to the trailing edge 17 of the pole face. A motor constructed in accordance with the showing in Figs. 1 and 2 will be self-starting and will have a relatively high starting torque. The radial dimensions of the air gap are exaggerated in order to illustrate the construction utilized.

In the subsequent description of Figs. 3 to 8, which are directed to various modifications of the pole faces illustrated in Figs. 1 and 2, it will be understood that each pole face illustrated has substantially the same axial extent for each peripheral portion thereof.

I have illustrated a modification of the pole 2 at 21 in Fig. 3 in which case there is a progressive decrease in the radial spacing between the pole face and the rotor, from the leading edge 23 of said pole face to a point 24 which is between the leading edge 23 and trailing edge 25 thereof. The air gap may be constant between the points 24 and 25 of the pole face 22 and the flux density in this portion of the air gap may be uniform, while the flux density progressively increases from the trailing edge 23 to the point 24. Thus self-starting characteristics are imparted to the motor since the peripheral portion between the points 23 and 24 provides a progressive increase in the total flux passing through successive elongated areas extending axially across the pole face and of elementary width peripherally of the pole face.

In Fig. 4 a pole is indicated at 26 which is comparable to the pole 21 in Fig. 3. The face of this pole is indicated at 27 and the field is uniform from the leading edge 28 thereof to a point 29 which lies between the leading edge 28 and the trailing edge 30. From point 29 to the trailing edge 30, the radial spacing of the pole face from the rotor progressively decreases, so that along this part of the pole face, the field is inhomogeneous and progressively increases from the point 29 to the trailing edge 30.

Another modified form of pole is indicated at 31 in Fig. 5, in which the flux density along the face 32 thereof is uniform through peripheral portions adjacent each edge and is inhomogeneous through the peripheral portion of progressively decreasing radial spacing between the points 33 and 34 which are located between the leading and trailing edges of the pole face.

The starting characteristics of a motor having pole faces shaped as shown in Figs. 3, 4, and 5 may not be as pronounced as in a motor having pole faces of the type shown in Fig. 1. The progressive increase in the flux or inhomogeneous field extends substantially throughout the peripheral length of the pole face in Fig. 1, while in Figs. 3, 4, and 5 the peripheral extent of the inhomogeneous field represents only a portion of the total peripheral extent of the pole face.

The modifications shown in Figs. 3, 4, and 5 are combined in Fig. 6, in which a pole indicated at 35 has a face 36 through which the flux progressively increases from the leading edge 37 to a point 38 where the flux is abruptly decreased to a value comparable to that at point 37 and is again progressively increased to a point 39, where it is again abruptly decreased and is again progressively increased along the pole face to a point 40 which represents the trailing edge of the pole face.

tion is shown in Fig. 7 in which a pole is indicated at 41 and has a face indicated at 42. The leading and trailing edges of the pole face are designated at points 43 and 44. The flux density may be considered as uniform along the uniformly spaced portion of the pole face between the point 43 and the point 44. The face 42 is shown made up of a plurality of concentric portions of relatively small peripheral extent, each successive one of which is spaced radially from the rotor by a progressively decreasing distance, in proceeding from the edge 43 to the edge 44 of the pole. The axially extending boundary between the successive portions 45 is shown in the form of a sharp radially extending face 46. A motor having poles constructed in this manner will have self-starting characteristics since the magnetic flux through peripherally successive axially extending portions of the pole faces thereof will progressively increase in one direction around the periphery of the rotor.

A construction is illustrated in Fig. 8 which has the same general characteristics as the construction illustrated in Fig. 1. A pole is designated as 76 and the face thereof has the same radial spacing at all portions to provide a uniform air gap 15 between said face and the rotor indicated at 6. The required progressive increase in the flux in a peripheral direction is obtained by providing a second air gap 81 within the pole. The radial extent of this second gap progressively decreases from its end 82 adjacent the leading edge of the pole face to its end 83 adjacent the trailing edge of the pole face.

All of the above-described modifications of the pole faces are characterized by an increase in the magnetic flux through peripherally successive axially extending portions of the pole faces in one direction around the periphery of the pole face and it will be appreciated that this relation may also be obtained by combining principles illustrated in the various modifications shown.

In Figs. 9 through 11 another motor is illustrated in which the inhomogeneous field is obtained without utilizing the changing radial spacing between the faces of the pole and the rotor which characterizes Figs. 1–7. In Figs. 9 through 11 the poles are indicated at 51 and 52 and are located on opposite sides of a rotor 53 so as to provide an air gap 54 of uniform radial length between the rotor and all portions of the faces of the poles 51 and 52. The pole faces are substantially triangular in cross-section and increase in axial extent from their leading edge indicated at 55 to their trailing edge indicated at 56. As in the cases illustrated above, there is a progressive increase in the total flux passing through peripherally successive axially extending areas in each of said pole faces.

A somewhat modified form of the motor shown in Figs. 9 through 11 is illustrated in Figs. 12 through 17. The rotor and the poles of a two-pole motor have been illustrated in Figs. 12–14, in which Fig. 12 shows the rotor in end elevation and Figs. 13 and 14 are the respective poles in perspective. In order to clearly illustrate the cooperation of these elements, the two poles may be considered as having been displaced in radially opposite directions from the rotor and then rotated in opposite directions about a line perpendicular to the rotor shaft sufficiently to expose the faces of each pole. The motor is shown as comprising a pair of poles 61 and 62 which are spaced radially and on opposite sides of a each provided with at least one portion which is spaced radially from the rotor 63 by a relatively small distance and with at least one portion which is spaced radially from the rotor by a relatively great distance. Thus the face of each pole is shown as made up of two portions 64 and 65 adjacent the respective axial ends thereof, which are spaced radially by a short distance from the rotor 63 and through which the flux density is substantially uniform. The axial length of these portions 64 and 65 progressively increases in a peripheral direction from the leading edge 66 to the trailing edge 67 of the pole face. Each pole further comprises a centrally located face portion 68 of relatively great radial spacing from the rotor 63. It will be noted that the axial extent of the portion 68 decreases progressively with the progressive increase in axial extent of the portions 64 and 65.

The poles are laminated structures and each pole is shown as comprising outer laminations 69 and 70 and central laminations 71 and 72. Each lamination between the outer laminations 69 and 70 and the respective central laminations 71 and 72 is of greater peripheral extent than the next successive lamination and the irregular stepped surfaces defined by these laminations represent the boundaries of the areas 64, 65, and 68. Fig. 16 is a sectional elevation taken between the central laminations 71 and 72 in a direction toward the lamination 70 in order to illustrate the extent of the radial spacings of the pole face areas 64 and 68 from the rotor 63. The gap between portion 64 and the rotor is indicated by the arrow at 73 and is comparable to the spacing ordinarily employed between the pole faces and the rotor of conventional induction motors. The radial spacing of the face portion 68 from the rotor 63 is sufficient so that the flux contributed by this face 68 is negligible in comparison to the flux contributed by the face portions 64 and 65.

The flux density over each of the face portions 64 and 65 is substantially uniform and the magnetic flux through peripherally successive axially extending portions of each of these portions 64 and 65 progressively increases in the direction of the increasing axial extent of these portions. It will be seen that the outer laminations 69 and 70 completely embrace the periphery of the rotor 63. I have found that the operation of the motor is more satisfactory when the outer laminations are constructed in this manner than when the poles are constructed as two completely separated units.

A further modification of the pole face shown in Fig. 15 is shown in Fig. 17 in which a pole face 74 is made up of a plurality of areas 75 of relatively small radial spacing and a plurality of areas 76 of relatively great radial spacing. This pole may be constructed in the same manner as the pole shown in Fig. 15 and has the same advantages as the pole of Fig. 15. This pole is, however, more applicable to motors in which the pole faces are of relatively great axial extent. As in the case of Fig. 15, the areas 75 each progressively increase in axial extent in a peripheral direction along the pole face and produce a flux distribution in such manner that the magnetic flux through peripherally successive axially extending portions of the pole face formed thereby progressively increases in the same peripheral direction around the pole face and exerts a starting torque on the rotor. The forms of motors illustrated in Figs. 12–17 are described and 307,282, filed December 2, 1939.

The various forms of the motor illustrated in Fig. 1 through 17 may be combined to produce poles which bring about the desired flux distribution, for example, the form of pole face shown in Figs. 12 through 17 may be combined with the forms of pole faces shown in Figs. 1 through 8, or the form shown in Fig. 7 may be combined with the form shown in Fig. 5. Thus the drawings are only illustrative of the various means which may be used to bring about the desired flux distribution and I do not choose to be limited to the specific showings delineated therein.

It should be noted that contrary to expectation the efficiency and power factor of motors of this invention are high, even though relatively large maximum air gaps are employed.

Motors constructed according to Figs. 12 through 17 show definite advantages from the standpoint of heat dissipation. Taking Fig. 14 as an example, the flux density will be substantially uniform over the areas 64 and 65 so that the heat losses therein will be substantially uniform over each portion of the area. Since this area is somewhat triangular, the heat centers for each of these areas will be indicated generally by the points 77 and 78. These points lie relatively close to the outside laminations 69 and 70 respectively and adjacent the trailing edge of the pole face. Heat may, therefore, be more readily dissipated from this form of motor since the heat center is relatively close to the outside edges thereof and also because the cut-out face portion 68 exposes a portion of the pole to the air which is present between the pole face and the rotor. This form of the motor will in general run cooler than the forms illustrated in Figs. 1 through 11, since in each of those cases the heat center lies near the axial center of the pole face.

Figure 19:
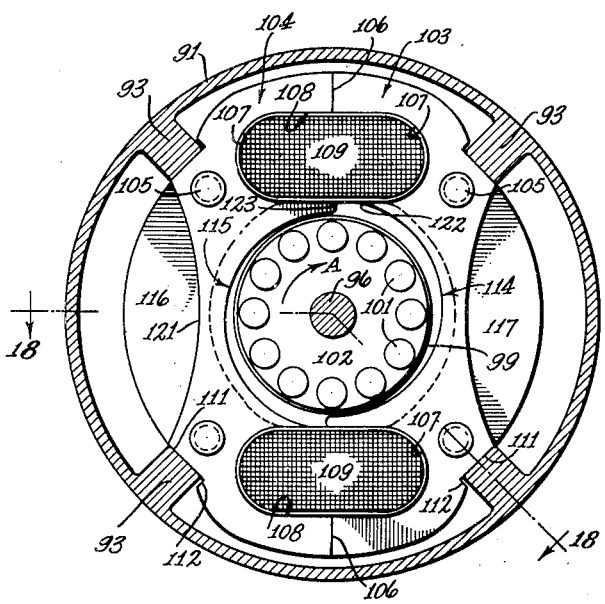
Fig. 19 is a partly sectional end elevation thereof taken on line 19—19 in Fig. 18.
Figure 20:
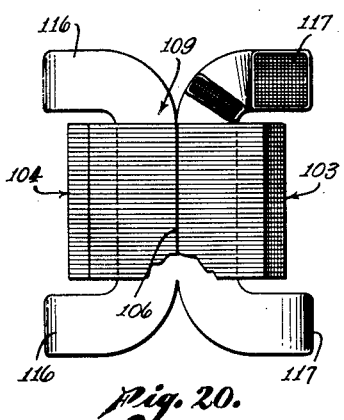
Fig. 20 is a partly broken away plan view of the stator core and windings shown in Fig. 19.

In Figs. 18 to 20 I have illustrated an advantageous embodiment of a motor constructed along the lines described in relation to Figs. 1 and 2. This motor combines the theoretical advantages of the previously described form with numerous practical advantages, being especially simple and inexpensive of construction, and efficient. The motor illustrated is adapted for end mounting as used in vacuum sweeper motors, and the motor of this invention is admirably adapted for such mounting since the housing may be used to hold the constituent parts of the motor together. Referring particularly to said figures, a substantially cylindrical housing is indicated at 91 which may have an end wall 92 formed integrally therewith; the housing is further shown as being provided with a plurality of longitudinally extending ribs 92 on its inner surface. A removable end wall is indicated at 94 and this wall may be secured to the housing 91 by means of suitable cap screws, one of which is indicated at 95 and is shown extending in threaded engagement with a rib 93.

The rotor shaft is indicated at 96 and is shown journaled in bearings 97 and 98 provided in the respective end walls 92 and 94. A laminated rotor is shown at 99 and may be suitably secured to the shaft 96 in any conventional manner. Rotor conductor bars are shown at 101 and are conductively secured to end rings 102 which are provided at each end of the rotor in the form of relatively thick circular plates.

It will be apparent that numerous forms of rotor construction may be substituted for that above described, for example, the common form of construction utilizing cast rotor bars may be used. However, it may be well to state that certain rotor constructions perform better than others. Thus rotors having an even number of conductors show better performances than rotors having an odd number of conductors, and I have also found that rotors having a skew approximately equal to the distance between successive rotor conductors show better performances than rotors having more or less skew. These relations appear to hold true for all forms of the motor shown herein. It should also be noted that I prefer to utilize rotors having greater diameter than length, whereby greater efficiencies may be obtained and ventilating ducts may be provided in the iron. The motor illustrated in Figs. 18 to 20 is designed to fit an existing housing and has had its proportions altered accordingly. Furthermore, rotors providing separate circuits for each pair of rotor conductors, rather than end rings which interconnect all the rotor conductors, show definite advantages.

Referring again to Figs. 18 to 20, the stator is shown as comprising two stacks of laminations indicated at 103 and 104, and each stack of laminations is held together by rivets 105 or the like in accordance with standard practice. The two stacks or sets of laminations are constructed to provide flat contact areas which abut at 106. Two wire-receiving notches 107 are provided in each of the stator sections and these notches 107 provide wire-receiving passages or slots 108 when the two stator sections 103 and 104 are placed in contact along their faces 106, which is their normal position when the motor is assembled. The coil windings in the slots 108 are indicated in section in Fig. 19 at 109. Each stator section is provided with longitudinally extending bearing faces 111 and radially extending shoulders 112 so that the stator sections may be inserted in the housing 91 with the faces 111 in sliding contact with the longitudinally extending ribs 93. The ribs 93 are provided with shoulders 113 to limit the longitudinal movement of the stator sections, and the shoulders 112 on the stator sections prevent rotary movement of the stator with respect to the housing. The stator may be held firmly against the shoulder 113 in any suitable manner, for example, through the agency of projections carried on the inside of end cover 94 or through set screws extending radially through the housing 91, as will be apparent to those skilled in the art.

The motor illustrated has two pole members 114 and 115 which are formed as parts of the stator sections 103 and 104 respectively, and is provided with one slot per hole. As shown particularly in Fig. 20, the coil 109 is conveniently split into two sections, as shown at 116 and 117, at each end of the stator, and these sections are bent outwardly away from the rotor shaft 96 toward the housing so as to provide clearance for the rotor shaft and permit insertion and removal of the rotor. The leads to the coil 109 are not shown and they may be brought out of the housing in any convenient manner.

The rotor will rotate in the direction of the arrow A shown on the rotor and the pole members 114 and 115 are so constructed and arranged as to provide a magnetic flux in the air gap which progressively increases through peripherally successive axially extending portions of the faces of the poles, in a peripheral direction along the faces thereof (the direction indicated by the arrow A). This increase is shown as accomplished, for example, in the same manner as shown in Figs. 1 and 2, by progressively decreasing the radial spacing between the face of each pole 114 and 115 and the rotor 99 in a peripheral direction along each pole face from its leading to its trailing edge.

In order to conserve material the radial extent of the stator adjacent the center of each pole as at 121 is made relatively short, since the greatest flux densities exist on the trailing edge of each of the poles where a relatively great iron section remains.

I have previously set forth certain features which I have found advantageous in the construction of rotors for motors of this type. I have also found that there are certain relations which should be preserved in the construction of the stator in order to insure the best results. There appears to be a certain relation which should preferably be maintained between the maximum air gap which is obtained at the leading edge 122 of the pole and the distance between this edge 122 and the trailing edge 123 of an adjacent pole. For practical reasons this trailing edge 123 is shown with a curved end. The distance from this curved end to the edge 122 is preferably not less than, and may advantageously be equal to, the radial length of the pole-rotor air gap at 122.

Referring particularly to Figs. 21 and 22, a two-speed motor is indicated generally at 131 and is shown as comprising a laminated stator 132 and a laminated rotor 133. The rotor is secured to rotor shaft 134 which is journaled in bearings 135 and 136 which are provided in end supports 137 and 138 respectively.

Coils are shown at 139 and 140 and are wound on suitable insulating spools or bobbins 141 and 142 encircling legs 143 and 144 respectively of the stator 132, said stator being also provided with portions extending inwardly between the coils 139 and 140 to provide two pole members 151 and 152 above and below the rotor. The stator 132 comprises a plurality of laminations which may be stacked alternately from opposite ends of the coil spools 141 and 142 to provide an overlapping interleaved construction as is common in transformer practice. Thus the coils may be assembled first and then the stator laminations may be stacked within the coils to provide the completed stator 132. The end supports 137 and 138 may be formed with rings 145 having radial projections 146 adapted to lie flat against the stator 132. Openings 147 are provided in the radial projections 146 so that bolts 148 may be passed through these openings and alined openings in the stator structure so that the stator may be clamped securely between the rings 145, as will be apparent to those skilled in the art. When the coils 140 and 141 are connected either in series or in parallel so as to provide a magnetic flux through the leg 144 which is in the same directions as the magnetic flux through the leg 143 at the same instant, that is, either upward or downward in both legs, the stator will provide two magnetic poles of opposite polarity at the respective pole members 151 and 152. The pole members 151 and 152 are shown as corresponding in shape and extent to the poles 114 and 115 of Fig. 19 and the poles shown in Fig. 1.

The rotor 133 may comprise a plurality of longitudinally extending rotor bars 153, riveted or otherwise conductively secured to conductive end rings 154 and 155. A ventilating fan may be provided by securing a ring 156 carrying a plurality of vanes 157 to one of the end rings, for example, to the end ring 154, through the agency of cap screws 158 or the like. When the coils 139 and 140 are energized in the same direction, as above described, the pole 151 will extend from a leading edge 159 where the radial spacing between the pole face and the rotor is the largest to a trailing edge 161 where the spacing is at a minimum. The leading and trailing edges of the pole 152 are indicated at 162 and 163. The motor will then operate as a two-pole motor and will have a corresponding speed.

If the coils 139 and 140 are now energized so as to produce magnetic fluxes which are opposite in direction in each leg at any instant, that is, if the coil 140 produces an upwardly directed flux in the leg 144 at the same instant when the coil 149 produces a downwardly directed flux in the leg 143, the motor will operate as a four-pole motor and will have a speed which is approximately one-half the speed of the two-pole motor. Under these conditions the pole members 151 and 152 may each be considered as defining two magnetic poles of opposite polarity. At one instant, for example, the pole members 151 will define a north pole extending from point 159 to a point 164 located on the peripheral portion of the pole face approximately two-thirds the distance between the points 159 and 161, and a south pole extending from point 164 to point 161, while pole member 152 will define two corresponding poles between points 162 and 165 and points 165 and 163. In order to accentuate this division of the poles, the smallest section of iron in the stator is provided adjacent the points 164 and 165.

The coils 139 and 140 may be connected either in series or in parallel and the change in speed may be effected by changing the polarity of one coil with respect to the other. In Fig. 23 the coil 140 is shown connected across line terminals 166 and 167 and coil 139 is shown connected in parallel with coil 140 through a reversing switch 168. Operation of the reversing switch from one position to the other will change the speed of the motor since the polarity of the coil 139 is changed with respect to the polarity of the coil 140. A switch is shown at 169 adjacent the line terminal 166 for turning the motor on or off.

In Fig. 24 the coil 140 is shown with one end connected to line terminal 166 through the switch 169 and with its other end connected to one side of a reversing switch 170. The other side of the reversing switch is shown connected to line terminal 167 and coil 139 is connected across the reversing switch. Thus the coils 139 and 140 are in series. The polarity of coil 139 may be changed with respect to coil 140 by operating the reversing switch 170 and the speed of the motor will be changed accordingly. If the switch 170 is provided with a neutral or non-contacting position, the switch 169 may be omitted since both coils will be de-energized when this switch is in the neutral position.

The system of starting described herein may be likened to a repulsion system of starting since the currents produced in the armature conductors are used for the purpose of starting. Thus repulsion starting is produced without the use of a commutator or brushes by providing a progressive increase in the flux density in a peripheral direction around the face of one or more poles.

Every motor may be considered as made up of one or more magnetic circuits each of which includes a pair of pole members and their connecting stator core portion, the rotor, and the air gaps between the rotor and the pole faces, along with any other air gap which may be included in the path of the flux in the particular circuit under consideration. The asymmetric flux distribution according to this invention may be considered as being obtained through progressively decreasing the reluctance of the portion of the magnetic circuit through successive peripheral portions of one or more pole faces. The lower limit of the reluctance of any portion of the magnetic circuit through any peripheral portion of a pole face is well determined by the minimum air gap between that portion and the rotor.

This minimum spacing is determined by mechanical considerations and is approximately the same for all types of induction motors; hence, the constructions utilizing asymmetric flux distributions of this invention tend to have higher reluctance circuits than comparable conventional motors. I find it advantageous, therefore, to provide means for decreasing the magnetic reluctance of these circuits after the motor has started. Thus I have found that I may increase the running efficiency, particularly in the larger sizes of single-phase induction motors utilizing the above-described type of starting, by changing the distribution of the magnetic field from the progressively increasing flux distribution to a substantially sinusoidal or symmetric flux distribution over the face of each pole while decreasing the reluctance of the magnetic circuits including these poles. Such motors start in the manner described above and run as straight single-phase induction motors. The desired change in the flux distribution in the pole faces may be obtained by moving a portion of a pole member so as to provide a radial spacing along the circumferential extent of a pole face which provides the desired substantially symmetric flux distribution in the air gap. This is preferably done to each pole which has an asymmetric flux distribution during starting. This, like the starting, may also be accomplished through purely mechanical means without the use of any commutators or contacting devices.

Figure 25:
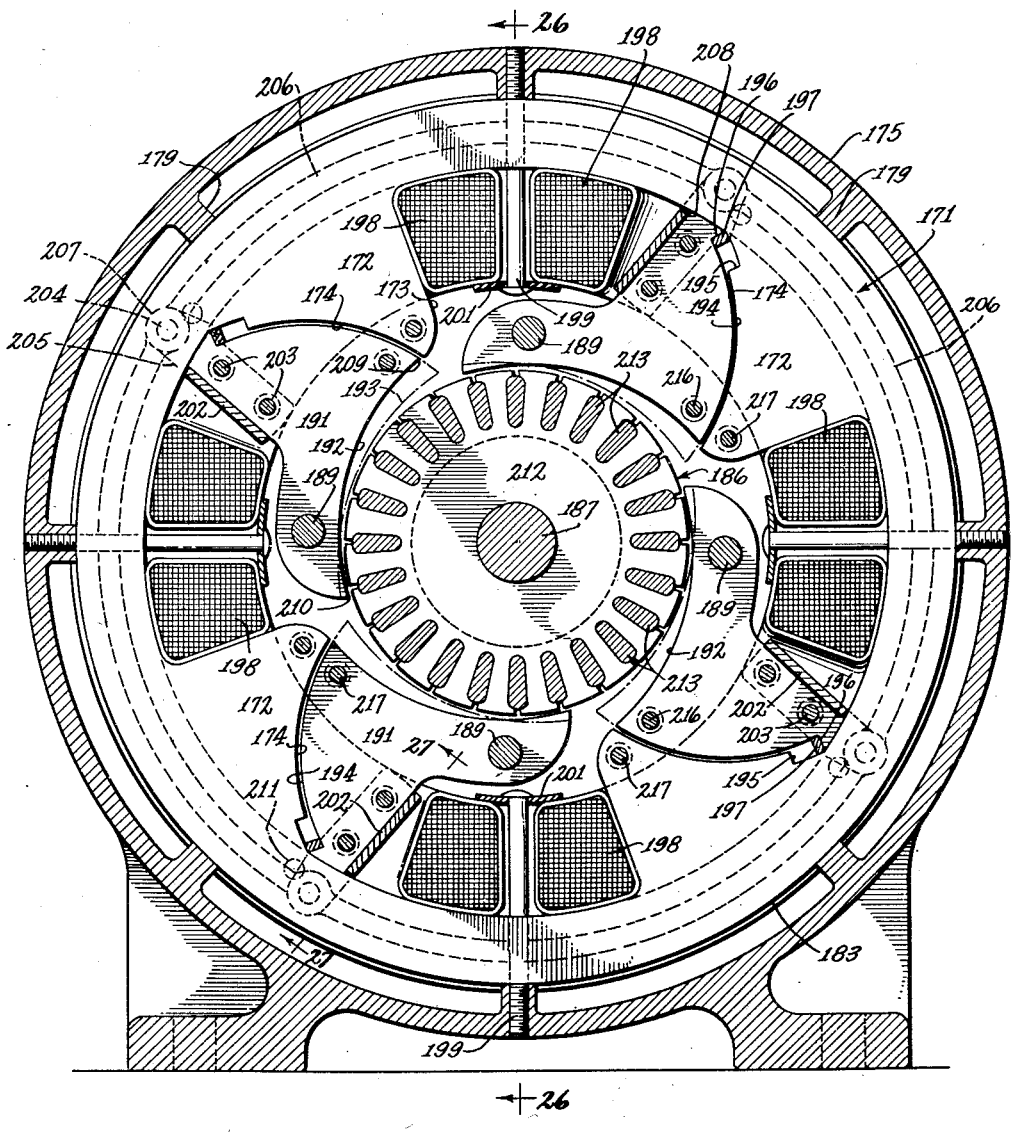
Fig. 25 is a transverse section, taken on line 25—25 in Fig. 26, of a motor of my invention in which a pole portion is movable to provide a flux distribution in a pole face which is different when the motor is running than when it is starting.
Figure 27:
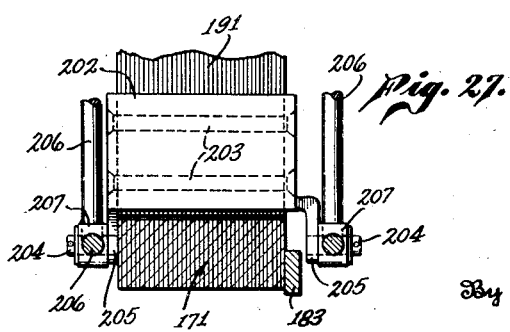
Fig. 27 is a sectional detail thereof taken on line 27—27 in Fig. 25.
Figure 26:
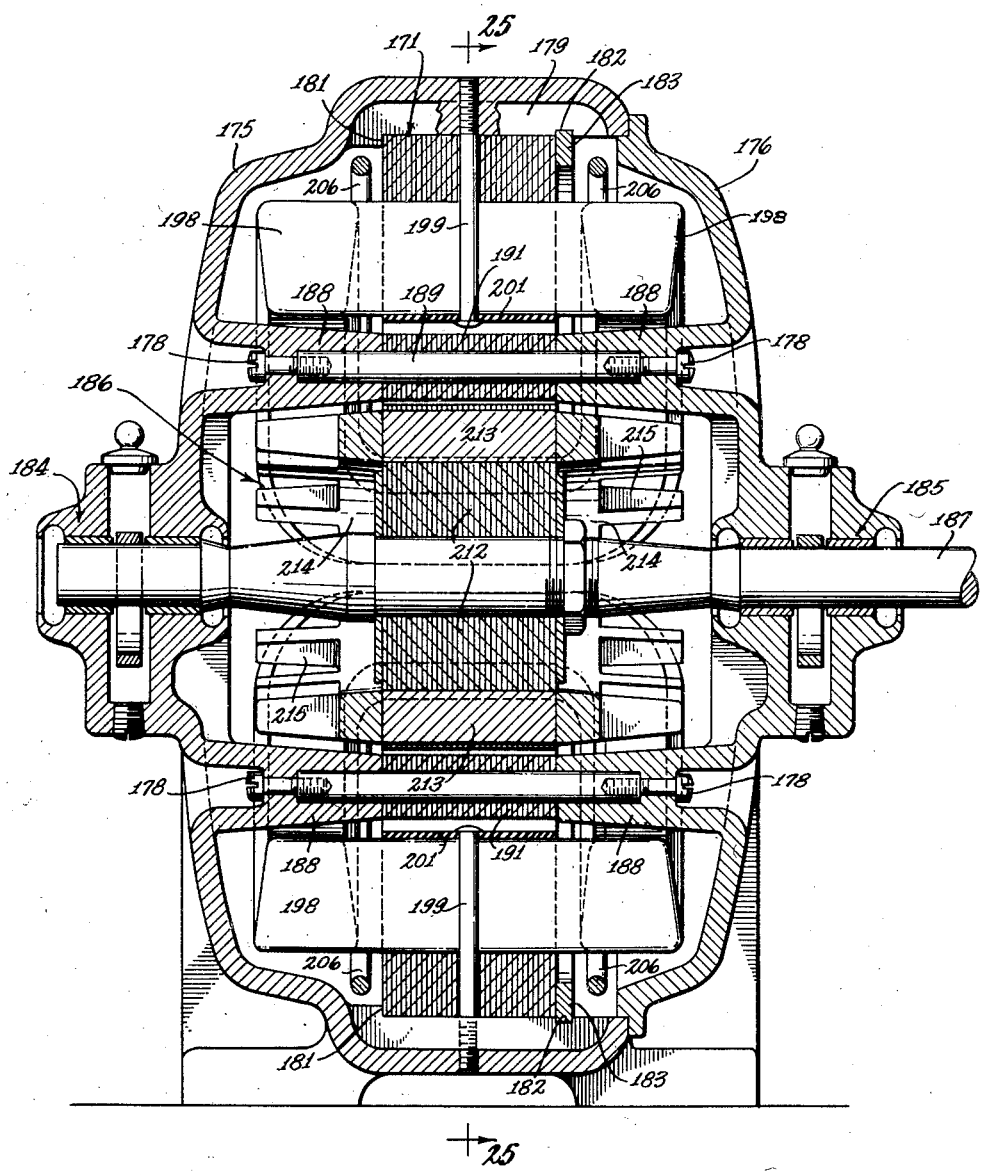
Fig. 26 is a longitudinal section thereof taken on line 26—26 in Fig. 25.

Referring to Figs. 25 through 27, a pole-shifting motor of this invention is shown as comprising a laminated stator core 171 of generally annular shape and preferably provided with a plurality of inwardly and radially extending fixed pole portions 172 having radially extending faces 173 and arcuate faces 174. Four such stationary pole portions are shown in Fig. 22, one for each pole of the motor. The stator 171 is held in position between frame members 175 and 176 which are secured to one another through the agency of cap screws 178. The frame member 175 is provided with a plurality of longitudinally extending, inwardly directed ribs 179 which are provided adjacent one end with shoulders 181 and adjacent their other ends with notches 182. The stator may be placed in the frame member 175 in engagement with the shoulders 181, and a split ring 183 may be compressed and placed in position against one side of the stator so that upon expansion of the ring 183 it will enter the notches 182 and hold the stator 171 firmly in position in the frame member 175. This method of assembly conforms substantially to standard practice and need not be detailed further herein.

The frame members 175 and 176 are shown with bearings at 184 and 185 respectively, and for the sake of simplicity they are shown provided with ring-type oilers. A rotor is indicated and 185. In assembling the motor the stator 171 may be first placed in position in the frame member 175, then the rotor may be inserted through the stator with the shaft 187 extending into the bearing 184. The frame member 176 may then be placed in position with the rotor shaft 187 extending through the bearings 185 and the cap screws 178 inserted through the frame members 175 and 176 to hold the motor in assembled relation. The frame members 175 and 176 are further provided with inwardly extending bosses 188 which cooperate to hold pivots 189 which extend longitudinally of the motor and are positioned approximately intermediate the successive stationary pole portions and within the annular stator member 171. Pivots 189 are further shown as drilled and tapped to receive cap screws 178 which serve to hold the stator frame members 175 and 176 in assembled relation.

Each pole of the motor is shown as including a movable portion 191 providing a pole face 192 extending axially and peripherally with respect to the rotor and spaced radially therefrom. The movable portions 191 are each pivoted about a pivot 189 and are movable about this pivot from an outer position shown in full lines to an inner position shown in dot-dash lines at 193. The movable pole member 191 is provided with a curved face 194 which has a curvature conforming to a circular arc about the pivot 189. The curvature of the arcuate face 174 of the fixed pole portion conforms to that of the face 194 and the two faces are in close engagement so that surface contact is maintained between these two faces for all positions of the movable pole member 191 between its inner and outer positions so as to minimize the reluctance of the magnetic circuit through the composite pole member. The stationary pole member 172 is provided with a shoulder 195 and the movable pole member 191 is provided with a cooperating shoulder 196 to which may be secured a resilient shock-absorbing member 197. The shoulder 195 limits the movement of the member 191 and the resilient member 197 serves to reduce mechanical shock and noise when the member 191 reaches the end of its movement.

Each of the movable pole members 191 is provided at its outer end with a U-shaped clamping member 202 which may be held in engagement therewith in any suitable manner, for example, with rivets 203 which extend in a longitudinal or axial direction through each of these pole members and serve to hold the laminations together as well as to hold the U-shaped clamping member in engagement therewith. The clamping members are each provided with pins 204 carried by projecting lugs 205 at the outer end of the clamping member. A spring ring 206 is provided at each side of the stator and each of these rings is provided with enlarged portions 207 which are drilled to form eyelets which accommodate the pins 204 and are equally spaced from one another so that the movable pole pieces will be biased by said spring ring toward their outer or full-line positions with their outer edges 208 in engagement with the stator 171. When the movable pole pieces are in this outer position the air gap between the periphery of the rotor 186 and the pole faces 192 progressively decreases from the leading edge 209 to the trailing edge 210 of each pole face and as a consequence the magnetic flux through peripherally successive axially extending trailing edges 209 and 210.

The stator 171 further comprises a plurality of coils 198 each of which spans a pole including the fixed and movable portions thereof. The coils 198 and the fixed portion of the stator may be held in position through the agency of bolts 199 provided with insulating pressure members 201 at one end which engage the inner sides of the coils, and with threads engaging the frame member 175 at the other end. No connections are shown for the coils 198, but it will be understood that they may be connected either in series or parallel or in any other suitable relation, and in such manner as to provide successive magnetic poles of opposite polarity.

Upon energizing the coils 198 the rotor will tend to rotate due to the above-described progressively increasing flux in one direction along the pole faces and the motor will start after the manner previously described. At the same time a magnetic force will be exerted between the periphery of the rotor 186 and each of the pole faces 192 which will tend to bring the pole faces 192 toward the rotor. Since the movable portions of the poles are pivoted at 189 they will tend to rotate about this center to the dot-dash inner position 193 and the pivot pins 204 will be moved from their original position to the dot-dash position indicated at 211. When the poles are in this inner or running position, the distance between the successive pins 204 will be less than when the poles are in the unenergized or starting position, since the angular distance between these pins remains constant while their radial distance from the center of the shaft 187 decreases. This will produce an outward bowing of the portions of ring 206 between the pins 204, and the resilience of the spring will tend to restore the movable pole members to their outer positions when the magnetic force between these pole members and the rotor is interrupted, as when the coils 198 are deenergized.

It will be seen that the movement of the movable pole portions to their inner positions serves to decrease the reluctance of the previously mentioned magnetic circuit which includes the pole members. In the example illustrated in Figs. 25 to 27, this movement results directly in a decrease in the reluctance of the air gap between a pole face and the rotor. It is advantageous to have this change in reluctance accompanied with a change in flux distribution at the face of the pole member under consideration. In general, it is preferable to change the asymmetric flux distribution obtained at the face of the pole member when the movable portion thereof is in its outer position, to a more symmetric flux distribution when said movable portion is in its inner position. The most advantageous symmetric flux distribution has been found to be a sinusoidal distribution.

The faces 192 of the poles 191 and the position of the pivots 189 are therefore shown as being so constructed and arranged that the desired progressive increase in flux in a peripheral direction is obtained when the pole faces are in their outer position at starting, and a sinusoidal distribution of the flux is obtained when the pole pieces are in their running position. The advantages of a sinusoidal flux distribution at the pole faces of a single-phase induction motor are fully brought out in my copending application Serial No.

The rotor 186 may comprise a plurality of laminations 212 held in position on the rotor shaft 187 in any conventional manner and provided with slots carrying rotor conductors 213 which may be cast integrally with end rings 214. The end rings are shown provided with longitudinally and radially extending fan blades 215 which may be cast integrally therewith and may be spaced uniformly around the circumference of the end ring, for example, spaced by the distance of two rotor conductors. Ventilating openings, not shown, may be provided at suitable positions in the frame members 175 and 176 and in the rotor to provide for cooling, in accordance with known practices. Rivets are provided at various places in the structure, for example, at 216 and 217 in the portions of the pole members, to hold the laminations together, as will be apparent to those skilled in motor construction.

The form of construction shown in Figs. 25 to 27 is to be considered as illustrative of the principles underlying the starting of a motor with an asymmetric or inhomogeneous flux distribution in the pole faces and the subsequent movement of a pole portion to provide a lower reluctance magnetic circuit so as to obtain a better running efficiency. It is belived apparent that the movable pole portions 191 need not comprise the whole face of a pole but may comprise only a portion thereof. Thus pole faces comparable to those shown in Figs. 3 through 5, for example, may be constructed so that the portions thereof providing the progressive increase in flux are movable in the same manner as the movable pole portions 191 in Figs. 25 to 27, while the fixed pole portions 172 are so formed as to provide the pole face portions of uniform flux density.

It may be advantageous to provide some means for retarding the movement of the movable portions of the pole members so as to increase the length of time during which starting conditions exist. This may be accomplished by the use of dash pots secured to the frame and connected to one or more of the movable portions 191. Under some circumstances the rings 206 may be omitted and each one of the movable pole portions may be resiliently biased to their outer or starting position by separate springs and and a separate retarding member may be provided for each one of these pole portions.

Although the specific description has been primarily directed to examples of motors in which each pole is shaped and arranged so as to provide an asymmetric flux distribution at the face thereof during starting, and to motors in which each pole member is provided with a movable portion, it is to be understood that motors in which only a single pole member has the desired asymmetric flux distribution at its face will have self-starting characteristics and that motors in which only a single pole member is provided with a movable portion will operate to bring about the desired results.

It is also believed apparent that this invention is applicable to motors having any desired number of poles, and I do not choose to be limited to the modifications shown and described herein, but rather to the scope of the appended claims.

I claim:

1. A self-starting single-phase induction motor which comprises: a rotor having a core; and a stator whose core is provided with a pair of pole members defining magnetic poles of opposite polarity and having faces extending peripherally and axially with respect to said rotor and spaced radially therefrom, said rotor core and stator core providing a magnetic circuit which includes said pole members, at least one of said pole members comprising a portion which is movable to an outer position in which the magnetic flux through peripherally successive axially extending portions of the face of said one pole member progressively increases in a peripheral direction and exerts a starting torque on said rotor and to an inner position in which the reluctance of said magnetic circuit is less than when said pole portion is in said outer position.

2. A motor as set forth in claim 1, in which said movable pole portion is so shaped that the flux distribution at the face of said one pole is substantially sinusoidal when said movable portion is in said inner position.

3. A motor as set forth in claim 1, said movable portion being biased toward said outer position and being movable to said inner position by the magnetic attraction of said portion to said rotor.

4. A motor as set forth in claim 1, and also comprising spring means associated with said movable pole portion and resiliently biasing the same toward said outer position.

5. A self-starting single-phase induction motor which comprises: a rotor having a core; and a stator whose core is provided with a pair of pole members defining magnetic poles of opposite polarity and having faces extending peripherally and axially with respect to said rotor and spaced radially therefrom, said rotor core and stator core providing a magnetic circuit which includes said pole members, each of said pole members comprising a portion which is movable to an outer position in which the magnetic flux through peripherally successive axially extending portions of the face of said pole member progressively increases in a peripheral direction and exerts a starting torque on said rotor and to an inner position in which the reluctance of said magnetic circuit is less than when said pole portion is in said outer position.

6. A motor as set forth in claim 5, in which each of said movable pole portions is so shaped that the flux distribution at the faces of each of said poles is substantially sinusoidal when said movable portions are in said inner position.

7. A motor as set forth in claim 5, said movable portions being biased toward said outer position and being movable to said inner position by the magnetic attraction of said portions to said rotor.

8. A motor as set forth in claim 5, and also comprising spring means associated with said movable pole portions and resiliently biasing the same toward said outer position.

9. A self-starting single-phase induction motor which comprises: a rotor having a core; and a stator whose core is provided with a pair of pole members spaced around said rotor and defining magnetic poles of opposite polarity, at least one of said pole members comprising a movably mounted portion having a face extending peripherally and axially with respect to said rotor and spaced radially from said rotor to provide an air gap, said portion being movable to an outer position in which said radial spacing progressively decreases in one peripheral direction so that there is a progressive increase in the magnetic flux through peripherally successive axially extending portions of the face of which the magnetic reluctance of said air gap is less than when said movable portion is in said outer position.

10. A motor as set forth in claim 9, in which said movable portion is so shaped that the flux distribution at face thereof is substantially sinusoidal when said movable portion is in said inner position.

tion and being movable to said inner position by the magnetic attraction of said portion to said rotor.

12. A motor as set forth in claim 9, and also comprising spring means associated with said movable portion and resiliently biasing the same toward said outer position.

JACOB H. SCHURCH.